Sept. 19, 1967 A. E. WHITESIDE 3,343,143

RANDOM ACCESS MEMORY APPARATUS USING VOLTAGE BISTABLE ELEMENTS

Original Filed Jan. 23, 1961 2 Sheets-Sheet 1

INVENTOR.
ARLISS E. WHITESIDE

BY Richard I. Seeger
ATTORNEY

Sept. 19, 1967 A. E. WHITESIDE 3,343,143

RANDOM ACCESS MEMORY APPARATUS USING VOLTAGE BISTABLE ELEMENTS

Original Filed Jan. 23, 1961 2 Sheets-Sheet 2

*INVENTOR.*
ARLISS E. WHITESIDE

*BY* Richard J. Seeger

ATTORNEY

United States Patent Office 3,343,143
Patented Sept. 19, 1967

3,343,143
RANDOM ACCESS MEMORY APPARATUS USING VOLTAGE BISTABLE ELEMENTS

Arliss E. Whiteside, Royal Oak, Mich., assignor to The Bendix Corporation, a corporation of Delaware Continuation of application Ser. No. 351,276, Mar. 9, 1964, which is a continuation of application Ser. No. 84,095, Jan. 23, 1961. This application Aug. 12, 1965, Ser. No. 483,005
4 Claims. (Cl. 340—173)

ABSTRACT OF THE DISCLOSURE

A random access digital memory apparatus having a first set of conductors laid over, but insulated from, a second set of conductors to form a grid network with a plurality of tunnel diodes and resistors in series connecting each conductor of the first set with every conductor of the second set in combination with a transformer for each conductor of the first set connected midway between the conductors of the second set and a sensing conductor wound about each transformer with the winding in successive transformers being reversed in direction.

This invention pertains to a random access digital memory apparatus and, more particularly, to an apparatus which uses a multiplicity of voltage bi-stable elements, such as a resistance in series with a tunnel diode, to store an input signal. A voltage change across a bi-stable element of sufficient magnitude and direction will cause the element to go from one stable position to the other with an accompanying current change. It is possible, therefore, to tell which stable position the bi-stable element is in by applying a predetermined voltage and then noticing if there is any current change.

This is a continuation of my copending application Ser. No. 351,276, now abandoned entitled, "Random Access Memory Apparatus Using Voltage Bistable Elements," and filed Mar. 9, 1964, which is a continuation of my application Ser. No. 84,095, entitled, "Random Access Memory Apparatus Using Voltage Bistable Elements," and filed Jan. 23, 1961, now abandoned.

It is an object of this invention to provide a digital memory apparatus having a first set of conductors which are laid over but insulated from a second set of conductors to form a grid network. A plurality of negative resistance diodes, also called tunnel diodes, each with a series resistance are connected to the conductors in the first and second sets in such a way that each conductor in the first set has a diode connected thereto for every conductor in the second set. Every diode may have a full level of voltage applied thereacross by applying partial levels to the appropriate conductors in the first and second sets. Sensing means are connected to each conductor in the first set and the absence or presence of a signal in the sensing means will indicate which state of the two stable states said diode is in when a full level of voltage is applied thereacross. With this combination of tunnel diode, resistor, and grid network a very much simplified connection for the tunnel diode is provided. This simplified connection becomes extremely important since a typical grid network could have thousands of such diodes connected therein.

It is an object of this invention to provide a digital memory apparatus having a first set of lines which are laid over a second set of lines to form a grid network. A plurality of voltage bi-stable elements, such as tunnel diodes, each with a series resistance, are connected to each line in such a way that an element is between each line in the first set and every line in the second set so that every element may be separately energized by applying a voltage to the corresponding lines in the first and second sets. Each set of lines is energized through transformers so that a voltage applied to one line in one set will not affect the other lines in that set. Each line in the first set of lines is wound at its midpoint about the primary of a current transformer. A single wire forms the secondary for all of the current transformers with the direction of winding being changed for successive transformers. The current transformer wound as described above, balances out the fractional outputs from the elements connected to the lines in the first and second sets which are energized.

These and other objects will be better understood when a preferred embodiment is discussed in connection with the drawings in which.

Figure 1:
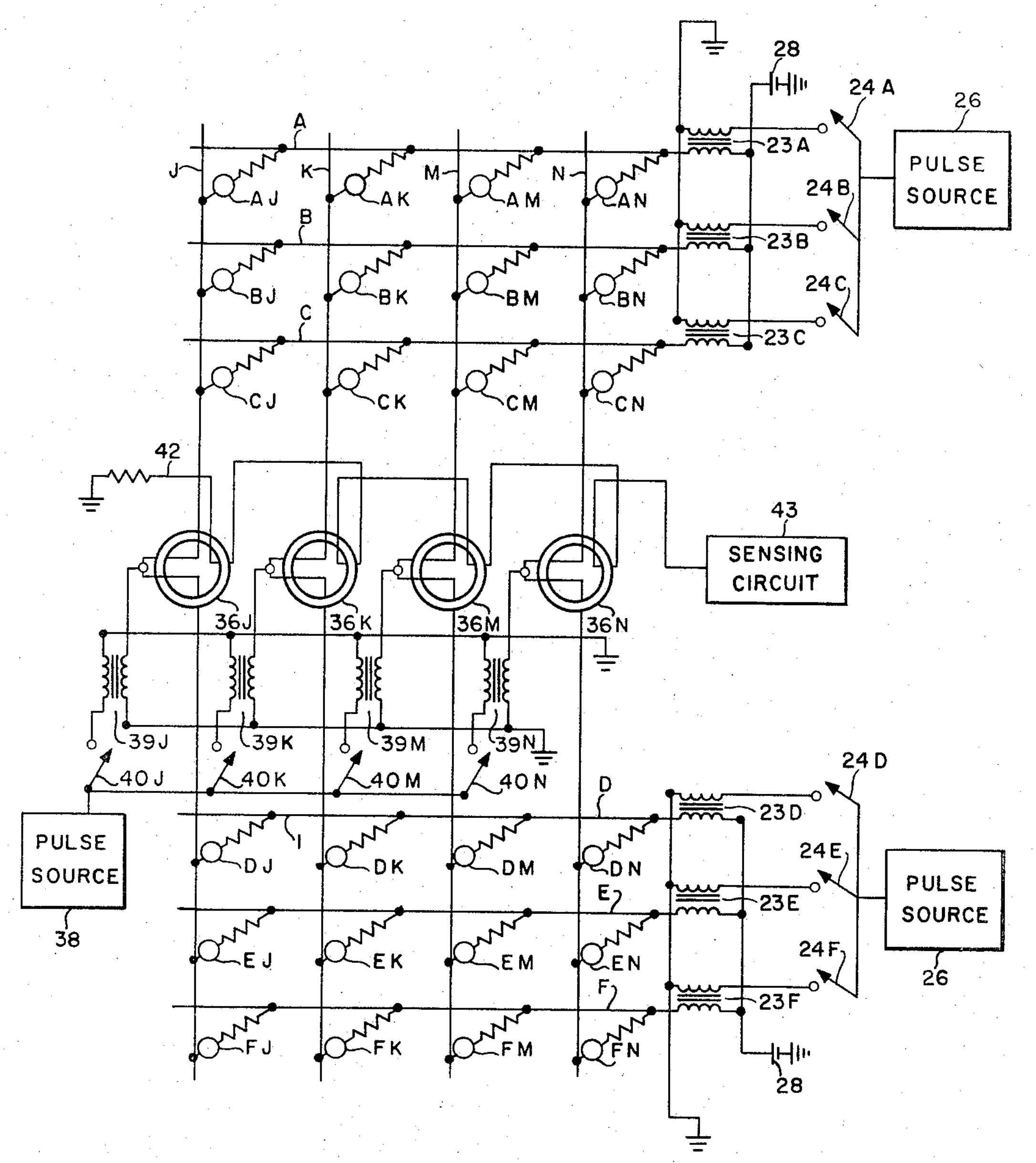
FIGURE 1 is a schematic plan view of a preferred embodiment of this invention.

FIGURE 1 has a plurality of horizontal lines A through F. Each of these lines is connectable through corresponding transformers 23A–23F and switches 24A through 24F to pulse sources 26. The secondaries of transformers 23A to 23F are connected to bias batteries 28 to ground. In this manner, pulses can be applied to any one of the lines A–F, by closing the appropriate switch 24A through 24F, which pulse will be in series with a battery 28 and yet not affect the voltage applied to the other lines.

Overlaying, but not making electrical contact with, lines A through F is a series of vertical lines J, K, M and N. Placed at the midpoint of vertical lines J, K, M and N are corresponding current transformers 36J to 36N. A pulse source 38 is connected through corresponding transformers 39J–39N and switches 40J–40N to the center point of each vertical line.

A secondary winding, or sense winding, 42 is wound about each transformer 36J to 36N with the winding in successive transformers being reversed in direction so that the winding in transformers 36J and 36M will be in reverse direction to the windings in 36K and 36N. Winding 42 is connected to a sensing circuit 43 which indicates when a signal is present in line 42.

Connected to each horizontal line A through F are four tunnel diodes each having a load resistor in series therewith. Line A is connected to lines J, K, M and N through a diode. In this manner, diode AJ forms the only connection between line A and J, diode AK forms the only connection between lines A and K, etc. The voltage across any diode may be controlled by application of voltages to the two lines to which it is connected.

Figure 2:
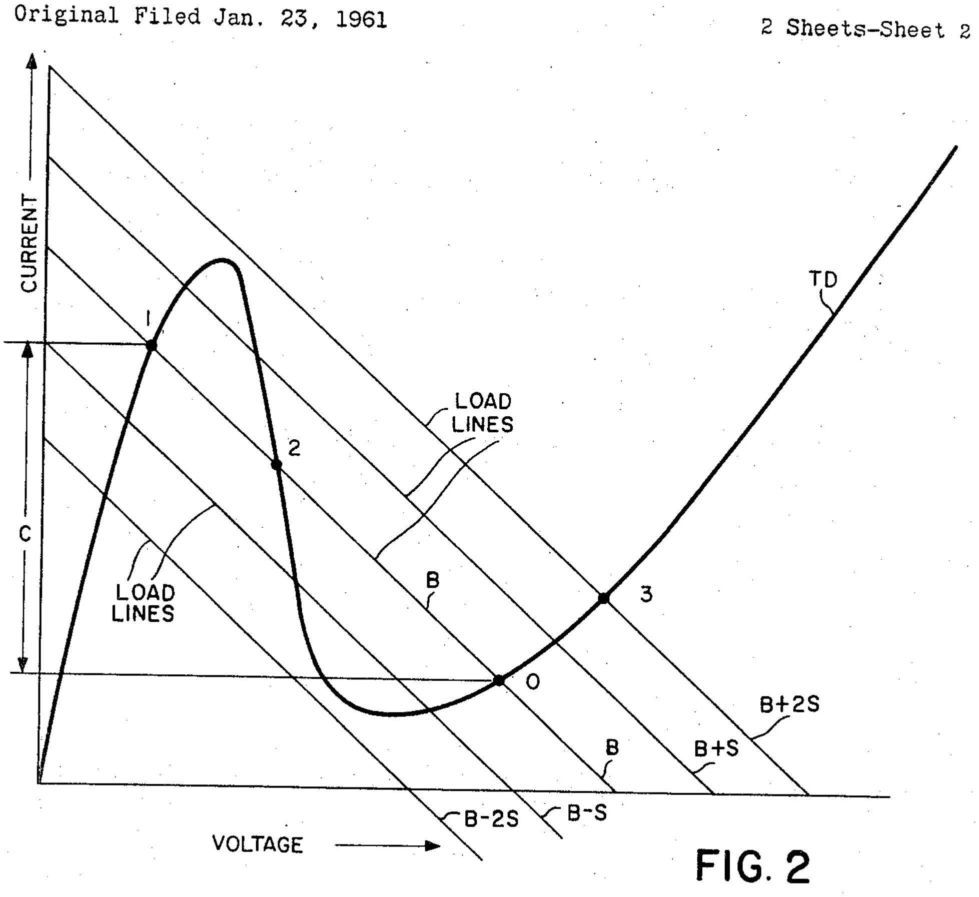
FIGURE 2 is the plot of a current voltage curve of a tunnel diode.

A tunnel diode and a load resistance provide a bistable device which means that for a given load line, there are two points at which the device is stable and for a given applied voltage, one of two currents will result, depending at which stable point the diode is. Looking at FIGURE 2 is seen a current voltage plot of a typical tunnel diode. Also shown are five load lines whereof the center load line B, results from a constantly applied bias to the diode such as battery 28 in series with the resistor; and load line B plus S and B minus S, each differing from B by a voltage amount S; and load lines B plus 2S and B minus 2S, each divering from B by a voltage amount 2S.

Line B crosses the current-voltage tunnel diode curve TD at three points, 0, 2 and 1, with points 0 and 1 being stable and point 2 being unstable. In other words, when the tunnel diode is at points 0 or 1, it will tend to stay at these points and if the point is caused to move, due to a stray noise or the like, it will automatically tend to return to the stable point, whereas at point 2 a minor disturbance will cause the operating point to move to either 0 or 1.

If a tunnel diode is at operating point 0 and a pulse is applied equal to a minus 2S volts, the tunnel diode will change its stability point to 1. Likewise, if the tunnel diode is at point 1 and a voltage pulse of +2S is applied, it will change its operating point to 0.

However, a voltage change of either +S or −S would not be enough to change from one stable point to another. Assuming the diode to be at point 1, any voltage increase which is less than 2S, and does not move the operating point over the hump or knee of curve TD, will not be enough to change the state of the tunnel diode; so that if a voltage pulse of only +S is applied, as soon as the pulse is removed the operating point will again be 1. In like manner, starting from 0 point, if a voltage pulse in a negative direction of less than 2S is applied, the diode-resistor bi-stable element will return to point 0 when the pulse is removed.

Figure 3:
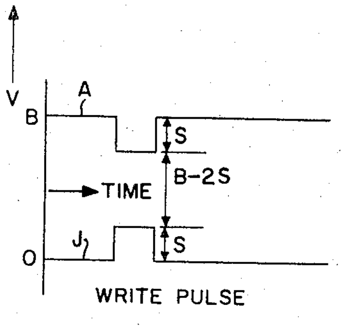
FIGURE 3 is a time-voltage plot of a "write" pulse applied to a tunnel diode.

With the tunnel diodes in FIGURE 1 starting from 0 position, any particular diode can be moved to the number 1 positon by pulsing one line connected to the tunnel diode with a voltage amount S and the other line connected to the selected tunnel diode with an amount S of the opposite polarity or direction, a full voltage change of −2S is applied across the selected diode to change its state from 0 to 1. This is shown in FIGURE 3 for diode AJ. Assuming diode AJ to be at position 0 and that it is desired to raise it to position 1 without changing the position of the other diodes connected to lines A and J, a voltage pulse of −S is applied by pulse source 26 to line A by closing switch 24A, and a pulse of +S is applied to line J from pulse source 38 through switch 40J. The pulses from sources 26 and 38 will combine to reduce the voltage across diode AJ by an amount 2S and hence change its position to position 1. The other diodes on line A and the other diodes on line J will not be changed since they will have received a pulse of only magnitude S.

Of course, if it were desired to change the states of all elements connected to a given line, this could be done by applying a pulse of 2S to that line and no pulses to any other lines.

Figure 4:
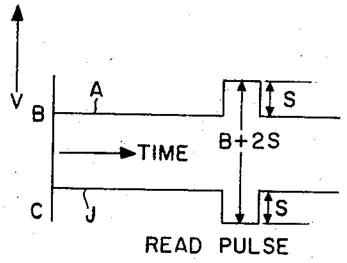
FIGURE 4 is a time-voltage plot showing a "read pulse.

To read diode AJ, or in other words to determine whether or not it is in position 0 or 1, a pulse of +S (FIGURE 4) is applied to line A from pulse source 26 by closing switch 24A and a pulse of −S is applied to line J from pulse source 38 by closing switch 40J. This results in a total change across diode AJ of +2S volts which will change its position from 1 to 0 if it were in the No. 1 position but if it were in the 0 position, a pulse of +2S volts would move the operating point to point 3 on the TD curve, from where it would return to position 0 after the pulse had been removed.

If there is a change from 1 to 0, then there will be a current change C (FIGURE 2) which can be sensed at transformer 36J and ultimately in the sensing circuit 43. However, if there is no change of state from one stable position to the other, there will be no current change.

As will be realized by those skilled in the art, ordinarily if a pulse is applied across any of lines J–N there will be a small current output from each diode connected to that particular line, and if these were allowed to add, they would appear to the respective transformer (36J–36N) as a current pulse of similar or greater magnitude than the change of state signal and a false output indication might be given in sensing circuit 43.

To prevent this, the current transformers 36J–36N are placed between the diodes in the upper half of the circuit, which for line J would be AJ, BJ and CJ and the diodes in the lower half of the circuit which are diodes DJ, EJ and FJ. Therefore, the small currents which flow when a pulse is applied to line J from the six diodes thereon will cancel in transformer 36J since the flux generated by three of the diodes is opposite in direction to the flux generated by the other three diodes. However, if a large change of state of current occurs in any of the diodes AJ to FJ, as there would be if the diode changed state from a 1 position to an 0 position, then this would appear in the transformer secondary and in sensing circuit 43.

Any voltage applied across any line A–F will result in small currents in each of the diodes connected to that particular line, which would add in transformers 36J to 36N and produce a false signal in sensing circuit 43. To prevent this, secondary winding 42 is wound in opposite directions in successive transformers so that, for line A, any small current produced in diodes AJ and AM will be cancelled by the small currents produced in diodes AK and AN.

While the transformer means in this embodiment comprises transformers 36J to 36N, all the windings could be made on one larger transformer. Other transformer assemblies or configurations embodying the principle of this invention could also be used.

*OPERATION*

Briefly, then, the operation of this embodiment is as follows. Assuming that all of the tunnel diodes are in a starting or 0 state and it is desired to change a particular diode, say diode EK to a 1 position, switches 24E and 40K are closed and pulse of −S is applied to line E and a pulse of +S is applied to line K resulting in a total change across the diode EK of a −2S volts causing the diode to change position to state 1. The diode will remain in this state until a read voltage, which is a +S pulse to line E and a −S pulse to line K is applied across diode EK at which time there will be a change of state from 1 to 0 and a resultant current change sensed in circuit 43. Due to the fact that the flux generated in transformers 36J to 36N from upper section of a winding J to N is in the opposite direction to the flux generated in the lower section, the small currents in the diodes due to the pulsing of any particular line will cancel out and not accumulate to cause a false signal in circuit 43. Also due to the reversal in windings of secondary or sensing winding 42 any pulse applied to lines A through F causing small currents in the diodes connected thereto, will not add to create a false signal in the sensing circuit 43.

The array shown in FIGURE 1 is a matrix and many of these would be used in a computer.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. Apparatus comprising a first set of electrical conductors, a second set of electrical conductors laid over and insulated from said first set to form a grid network, a plurality of negative resistance characteristic diodes, a resistor being connected to each of said diodes to form a resistor diode combination having two terminals and having two stable states with a change of applied voltage required to change from one stable state to the other, each of said resistor diode combinations being electrically connected at one terminal to a conductor in said first set and electrically connected at the other terminal to a conductor in said second set, each conductor in said first set being electrically connected to each conductor in said second set through only one resistor diode combination, means to pulse each conductor in each of said first and second sets, means to bias each diode, means to sense current change in any of said diodes, whereby the state of a given resistor diode combination may be determined by supplying a voltage pulse to the given resistor diode combination and then observing the presence or absence of an output from said given resistor diode combination in said means to sense a current change, transformer means being positioned substantially midway along the conductors of said first set, each of said conductors being wound at substantially its midpoint around said transformer means with substantially the same number of diode resistor combinations being on one side of the transformer means as there are diode resistor combinations on the other side of the transformer means, said pulsing means being applied to a center tap on the winding of said conductors on said transformer means.

2. The apparatus of claim 1 with said transformer means comprising individual transformer core means for each conductor in said first set, said conductors of said first set being wound about their respective transformer core means, a sensing winding being wound about each of said transformer core means, the turns of said sensing winding on each core means being in a reverse direction from the turns of said sensing winding on the next preceding core means.

3. The apparatus of claim 1 with second transformer means being between said means to pulse each conductor and each of said conductors, said pulsing means being connected to the primary winding of said second transformer means, the secondary winding of said second transformer means being connected to said conductors.

4. The apparatus of claim 3 with said means to bias each of said diodes being connected to said second set of conductors through the secondary winding of said second transformer means.

References Cited

UNITED STATES PATENTS

| | | | |
|---|---|---|---|
| 2,889,540 | 6/1959 | Bauer | 340—174 |
| 3,105,958 | 10/1963 | Slobodzinski | 340—173 |
| 3,144,640 | 8/1964 | Grooteboer | 340—174 |
| 3,149,313 | 9/1964 | Merz | 340—174 |

BERNARD KONICK, *Primary Examiner.*

T. W. FEARS, *Examiner.*